Feb. 23, 1932.   P. A. COULTER   1,846,187
COMBINED DIFFERENTIAL AND CHANGE SPEED GEARING
Filed March 3, 1930
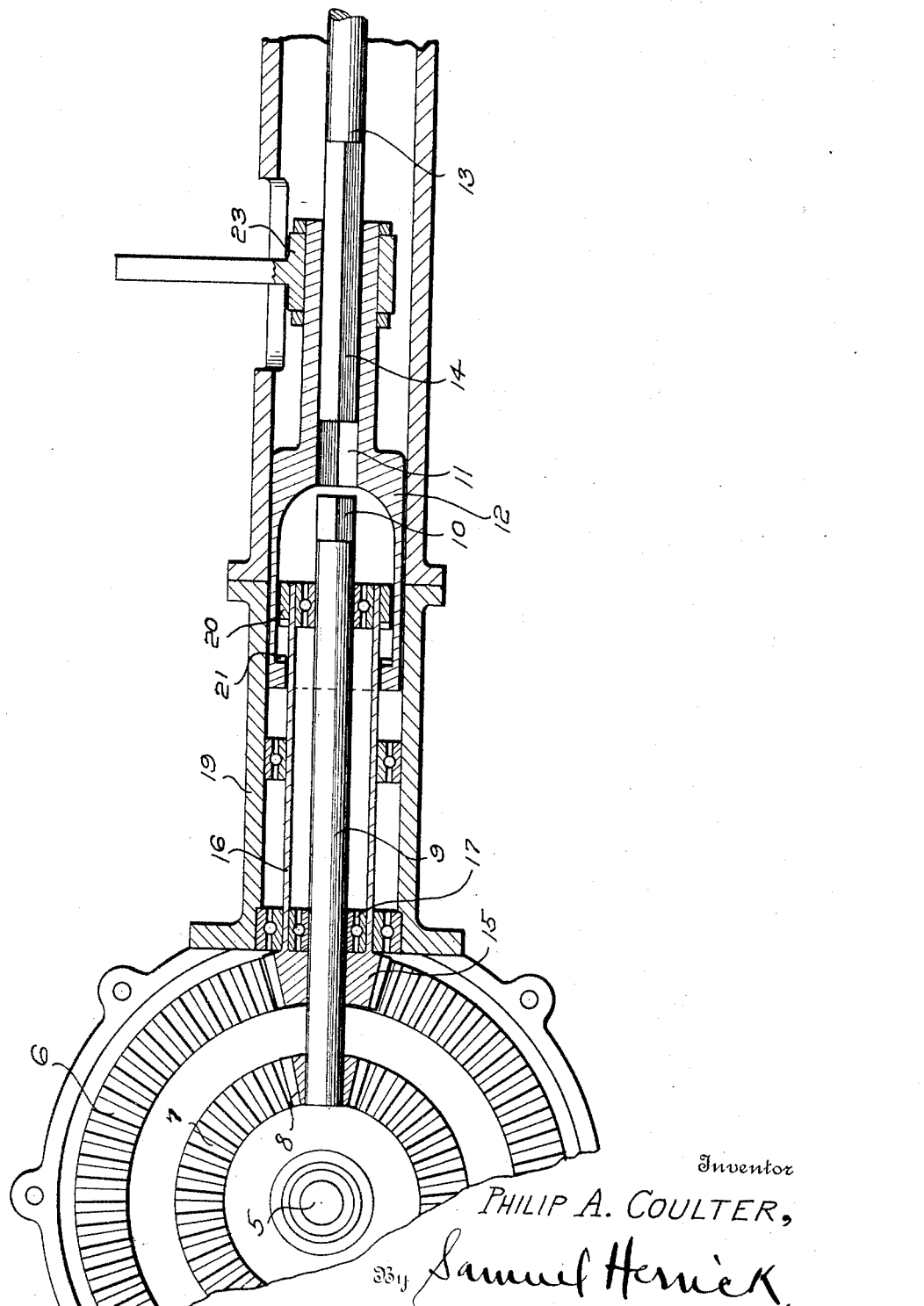
Inventor
PHILIP A. COULTER,
By Samuel Herrick,
Attorney Patented Feb. 23, 1932

1,846,187

UNITED STATES PATENT OFFICE

PHILIP A. COULTER, OF LAHOMA, OKLAHOMA, ASSIGNOR OF TWENTY-FIVE PER CENT TO S. H. McEVOY, OF ENID, OKLAHOMA, AND OF TWENTY-FIVE PER CENT TO EDWARD COULTER, AND TWENTY-FIVE PER CENT TO HERBERT COULTER, BOTH OF LAHOMA, OKLAHOMA

COMBINED DIFFERENTIAL AND CHANGE SPEED GEARING

Application filed March 3, 1930. Serial No. 432,941.

This invention relates to a combined differential and change speed gearing for use upon automobiles and trucks, and it has for its object to provide a high and low speed assembly incorporated with the differential gearing of an automobile and driven from the usual drive shaft of the automobile. It is common practice in present day automobile construction, to drive to the differential gearing through a longitudinally extending drive shaft, which drive shaft, in turn, is driven through a conventional type of transmission mechanism, by means of which three speeds forward and one speed in reverse, are provided. The present invention resides in interposing between such conventional type of drive shaft and the differential mechanism, a high and low speed change gear so that, as a result, I am able to secure six speeds forward and two speeds in reverse, and I do this by a very simple and inexpensive method, as hereinafter described.

The figure shown in the accompanying drawing is a longitudinal sectional view of the mechanism of the invention.

Like numerals designate corresponding parts in all of the figures of the drawing.

In the drawing, 5 designates the rear axle of a motor driven vehicle which, instead of carrying a single differential ring gear, as is the common practice, is provided with a large low speed ring gear 6, and a smaller high speed ring gear 7. A drive pinion 8 meshes with the ring gear 7 and is carried by a stub shaft 9, having an angular male end 10 that is adapted to be engaged by an angular socket 11, of a sliding sleeve or collar 12. The main drive shaft from the motor, is indicated at 13, said drive shaft being provided, in its length, with an angular portion 14, which has sliding engagement in the angularly formed bore 11 of the sliding sleeve. A pinion 15 meshes with the ring gear 6, said pinion being carried by a sleeve 16, through which the shaft 9 passes, the shaft 9 being journaled in sleeve 16 by bearings 17, and the sleeve 16 being journaled in a conventional type of housing 19. The sleeve 16 carries a clutch element 20, which is adapted to engage with clutch teeth 21, formed upon an extension of the sleeve 12, under certain positions of the parts. The sleeve 12 may be shifted longitudinally by a suitable conventional type of shifting yoke 23, which permits turning movement of the sleeve while maintaining engagement of the yoke with the sleeve.

The operation of the device is as follows: With the sleeve 12 shifted to its limit of movement toward pinion 8, the angular socket 11 is brought into engagement with the angular head 10 of shaft 9, and pinion 8 is caused to rotate and impart rotation at a relatively high rate of speed to the ring gear 7. With the sleeve 12 moved to its limit of movement away from the pinion 8, the clutch teeth 21 are brought into engagement with the clutch 20 and the sleeve 16 is caused to rotate and thereby impart rotation to pinion 15 and the larger ring gear 6, thus imparting a relatively slower rate of speed to the axle 5. With the sleeve in an intermediate position, the clutch teeth 21 are out of engagement with the teeth 20 and the socket element 11 is moved out of engagement with the angular head 10, and, thus, no rotation of the ring gears will take place. This is the neutral position of the device.

Since the main shaft 13 is capable of three speeds forward and one in reverse, and since all of these speeds may be individually varied through the change speed gearing described, it follows that the structure proposed will yield six speeds forward and two in reverse.

It is to be understood that the invention is not limited to the precise construction set forth but that it includes within its purview whatever changes fairly come within either the terms or the spirit of the appended claim.

Having described my invention, what I claim is:—

A structure of the character described, comprising a double differential ring gear having the ring gear sections of different sizes and concentric with respect to each other, a pair of pinions meshing with said ring gears, a stub shaft by which one of said pinions is carried, a rotative sleeve by which the other of said pinions is carried, a housing externally of said sleeve, anti-friction bearings between said sleeve and said housing and anti-friction bearings between the stub shaft and said sleeve and substantially at the ends of said sleeve, an external clutch member upon the inner end of said sleeve, a longitudinally extended variable speed drive shaft, a shift sleeve mounted for sliding movement with respect to the drive shaft and rotated by said drive shaft, said shift sleeve comprising extensions which extend outwardly beyond the external clutch member of the rotative sleeve and between said clutch member and the housing, and clutch elements upon said extensions which face toward the outwardly extending clutch members of the rotative sleeve, said shift sleeve being provided with an externally arranged socket and the inner end of the stub shaft being adapted to engage in the socket.

In testimony whereof I affix my signature.

PHILIP A. COULTER.